United States Patent
Yang

(10) Patent No.: US 12,196,932 B2
(45) Date of Patent: Jan. 14, 2025

(54) ZOOM LENS, CAMERA MODULE, AND ELECTRONIC DEVICE

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 504 days.

(21) Appl. No.: 17/588,337

(22) Filed: Jan. 30, 2022

(65) Prior Publication Data
US 2022/0155570 A1    May 19, 2022

Related U.S. Application Data

(63) Continuation of application No. PCT/CN2020/105208, filed on Jul. 28, 2020.

(30) Foreign Application Priority Data

Jul. 31, 2019 (CN) .......................... 201910703072.5

(51) Int. Cl.
  *G02B 15/14*    (2006.01)
  *G02B 13/00*    (2006.01)
  *G02B 5/20*    (2006.01)

(52) U.S. Cl.
  CPC .  *G02B 15/143503* (2019.08); *G02B 13/0045* (2013.01); *G02B 13/0065* (2013.01); *G02B 5/208* (2013.01)

(58) Field of Classification Search
  CPC .............................................. G02B 15/143503
  See application file for complete search history.

(56) References Cited

U.S. PATENT DOCUMENTS

5,062,695 A * 11/1991 Iwasaki ................ G02B 15/177
                                                                 359/689
5,325,236 A    6/1994 Tanaka
5,731,911 A *  3/1998 Kagoshima .... G02B 15/143503
                                                                 359/689

(Continued)

FOREIGN PATENT DOCUMENTS

CN     1580855       2/2005
CN     1685268      10/2005

(Continued)

OTHER PUBLICATIONS

WIPO, International Search Report for PCT/CN2020/105208, Oct. 28, 2020.

(Continued)

*Primary Examiner* — Robert E. Tallman
(74) *Attorney, Agent, or Firm* — Hodgson Russ LLP

(57) ABSTRACT

A zoom lens (10), a camera module (100) and an electronic device (1000). The zoom lens (10) comprises a first lens group (11) with negative focal power, a second lens group (12) with positive focal power, and a third lens group (13) with negative focal power, wherein both the second lens group (12) and the third lens group (13) can move relative to the first lens group (11); the following relations are met: $-2.5<FI/F2<-1.5$, and $-2<F3/F2<-1$.

20 Claims, 10 Drawing Sheets

(56) References Cited

U.S. PATENT DOCUMENTS

| | | | | |
|---|---|---|---|---|
| 5,867,325 | A | * | 2/1999 | Ohtake ............... G02B 15/177 359/689 |
| 6,052,234 | A | | 4/2000 | Mukai et al. |
| 2007/0053069 | A1 | * | 3/2007 | Yagyu ............ G02B 15/144507 359/676 |
| 2008/0106800 | A1 | * | 5/2008 | Shin ............... G02B 15/143503 359/689 |
| 2010/0214664 | A1 | | 8/2010 | Chia |
| 2010/0265380 | A1 | * | 10/2010 | Fukuta ........... G02B 15/143507 359/689 |
| 2015/0109485 | A1 | | 4/2015 | Ozaki et al. |
| 2019/0086638 | A1 | * | 3/2019 | Lee ....................... H04N 23/687 |

FOREIGN PATENT DOCUMENTS

| | | |
|---|---|---|
| CN | 101029959 | 9/2007 |
| CN | 101046551 | 10/2007 |
| CN | 200983034 | 11/2007 |
| CN | 101408664 | 4/2009 |
| CN | 100510830 | 7/2009 |
| CN | 101855584 | 10/2010 |
| CN | 201749247 | 2/2011 |
| CN | 103123415 | 5/2013 |
| CN | 205176367 | 4/2016 |
| CN | 106324813 | 1/2017 |
| CN | 106687848 | 5/2017 |
| CN | 106918900 | 7/2017 |
| CN | 108873271 | 11/2018 |
| CN | 109061858 | 12/2018 |
| CN | 109819149 | 5/2019 |
| JP | 2000330024 | 11/2000 |
| JP | 2006003544 | 1/2006 |
| JP | 2009025380 | 2/2009 |
| JP | 2009025534 | 2/2009 |

OTHER PUBLICATIONS

CNIPA, First Office Action for CN Application No. 201910703072.5, Jun. 29, 2021.

EPO, European Search Report for EP Application No. 20847669.7, Nov. 2, 2022.

CNIPA, Notification to Grant Patent Right for Invention for CN Application No. 201910703072.5, Mar. 2, 2022.

* cited by examiner

ZOOM LENS, CAMERA MODULE, AND ELECTRONIC DEVICE

CROSS REFERENCE TO RELATED APPLICATIONS

The present application is a continuation of International Patent Application No. PCT/CN2020/105208, filed Jul. 28, 2020, which claims priority to Chinese Patent Application No. 201910703072.5, filed on Jul. 31, 2019, the entire disclosures of which are incorporated herein by reference.

TECHNICAL FIELD

The present disclosure relates to optical imaging technology, in particular to a zoom lens, a camera module and an electronic device.

BACKGROUND

In the existing zoom mode, the captured scene may be enlarged when an image is captured by a digital zoom mode, while the image quality may be improved within a certain range when the image is captured by a hybrid zoom mode.

SUMMARY OF THE DISCLOSURE

The present disclosure provides a zoom lens, a camera module, and an electronic device.

The zoom lens of the present disclosure, includes in order from an object side to an image side: a first lens group, having a negative focal power; a second lens group, having a positive focal power; and a third lens group, having a negative focal power; both the second lens group and the third lens group are movable relative to the first lens group while the first lens group remains stationary relative to an imaging surface; the zoom lens satisfies following formula: $-2.5<F1/F2<-1.5$ and $-2<F3/F2<-1$; F1 is a focal distance of the first lens group, F2 is a focal distance of the second lens group, F3 is a focal distance of the third lens group.

The camera module of the present disclosure includes: a zoom lens, from an object side to an image side, including in order: a first lens group, having a negative focal power; a second lens group, having a positive focal power; and a third lens group, having a negative focal power; and a photosensitive element, arranged on an image side of the zoom lens; both the second lens group and the third lens group are movable relative to the first lens group while the first lens group remains stationary relative to an imaging surface; the zoom lens satisfies following formula: $-2.5<F1/F2<-1.5$ and $-2<F3/F2<-1$; F1 is a focal distance of the first lens group, F2 is a focal distance of the second lens group, F3 is a focal distance of the third lens group.

The electronic device of the present disclosure includes a housing and a camera module. The camera module is mounted on the housing. The camera module includes: a zoom lens, from an object side to an image side, including in order: a first lens group, having a negative focal power; a second lens group, having a positive focal power; and a third lens group, having a negative focal power; and a photosensitive element, arranged on an image side of the zoom lens; both the second lens group and the third lens group are movable relative to the first lens group while the first lens group remains stationary relative to an imaging surface; the zoom lens satisfies following formula: $-2.5<F1/F2<-1.5$ and $-2<F3/F2<-1$; F1 is a focal distance of the first lens group, F2 is a focal distance of the second lens group, F3 is a focal distance of the third lens group.

Additional aspects and advantages of embodiments of the present disclosure will be set forth in part in the following description. Some will become obvious by the following description or may be learned by practices of the present disclosure.

BRIEF DESCRIPTION OF THE DRAWINGS

The above described and/or the additional aspects and advantages of the present disclosure may become obvious and readily understood through the description of the embodiments in conjunction with the following drawings.

FIG. 15 (*b*) is a structural schematic view of an electronic device from another viewing angle according to some embodiments of the present disclosure.

DETAILED DESCRIPTION

Figure 1:
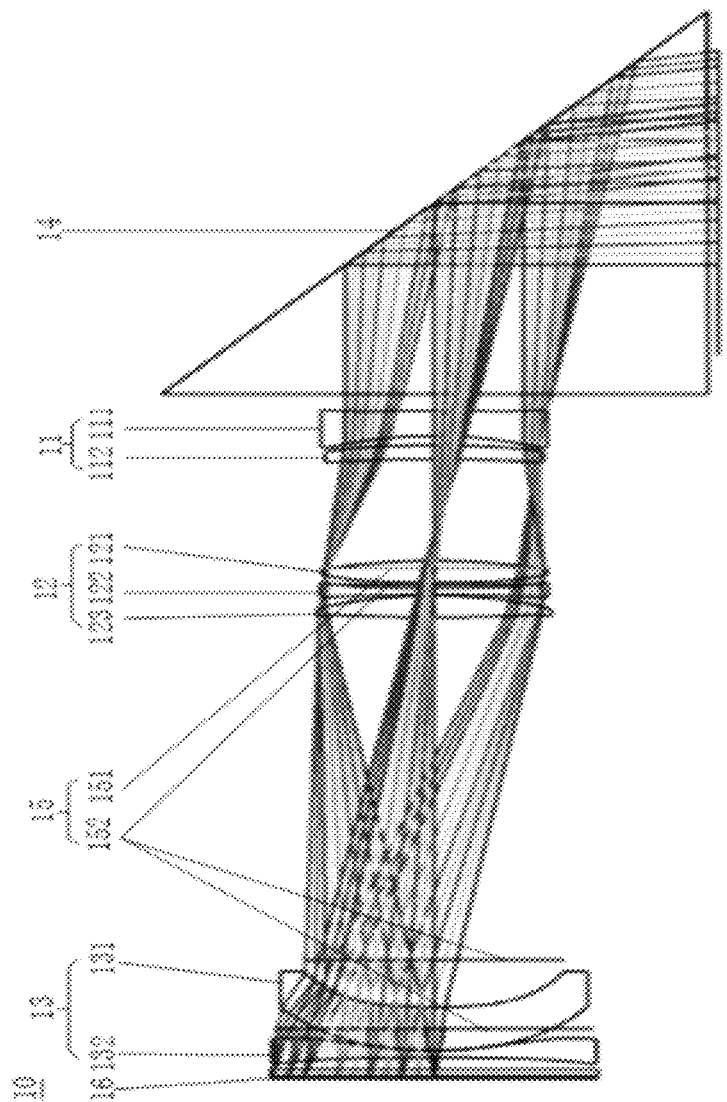
FIG. 1 is a structural schematic view of a zoom lens according to some embodiments of the present disclosure.

Embodiments of the present disclosure will be further described in the following combining the accompanying drawings. The same or similar reference numerals in the drawings refer to the same or similar elements or elements with the same or similar functions throughout.

In the present disclosure, unless expressly stipulated and defined otherwise, a first feature "on" or "under" a second feature may be that the first feature and the second feature are in direct contact, or that the first feature and the second feature are in indirect contact by an intermediate medium. Besides, the first feature being "above", "over", and "on" the second feature may be that the first feature is directly above or obliquely above the second feature, or merely indicating that the level of the first feature is higher than the second feature. The first feature being "below", "beneath", and "under" the second feature may be that the first feature is directly below or obliquely below the second feature, or merely indicating that the level of the first feature is lower than the second feature.

Additionally, the embodiments of the present disclosure described below in conjunction with the accompanying drawings are exemplary, which are only used to illustrate the embodiments of the present disclosure, not allowed to be construed as limitations of the present disclosure.

The present disclosure provides a zoom lens. The zoom lens includes in order from an object side to an image side: a first lens group, having a negative focal power; a second lens group, having a positive focal power; and a third lens group, having a negative focal power, both the second lens group and the third lens group are movable relative to the first lens group while the first lens group remains stationary relative to an imaging surface; the zoom lens satisfies following formula: $-2.5<F1/F2<-1.5$ and $-2<F3/F2<-1$; wherein F1 is a focal distance of the first lens group, F2 is a focal distance of the second lens group, F3 is a focal distance of the third lens group.

In some embodiments, the zoom lens further includes: a prism, arranged on a side of the first lens group opposite to the third lens group and having an incident surface and an exit surface; the incident surface is perpendicular to the exit surface.

In some embodiments, the first lens group includes a first lens and a second lens arranged from the object side to the image side; the second lens group includes a third lens, a fourth lens, and a fifth lens arranged from the object side to the image side; the third lens group includes a sixth lens and a seventh lens arranged from the object side to the image side. The zoom lens further includes: an optical stop, including an aperture stop and three vignetting stops; the aperture stop is arranged on an object side surface of the third lens, a first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

In some embodiments, the zoom lens satisfies following formula: $25<f2/f1<35$; $-1.2<f3/f1<-0.2$; $1<f4/f1<2$; $-1.2<f5/f1<-0.2$; $-2<f6/f1<-0.5$ and $0.2<f7/f1<1$; f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

In some embodiments, the zoom lens satisfies following formula: $TTL/FS<2.5$ and $TTL/FL<1.5$; TTL is a distance on an optical axis from an object side surface of the first lens to the imaging surface, FS is a focal distance of the zoom lens in a short-focus state, and FL is a focal distance of the zoom lens in a telephoto-focus state.

In some embodiments, the zoom lens satisfies a following formula: $TTL/H<4$; TTL is a distance on an optical axis from an object side surface of the first lens to the imaging surface, H is a height of the imaging surface.

In some embodiments, the zoom lens is configured to focus with a 14 mm focal distance in the short-focus state and focus with a 23 mm focal distance in the telephoto-focus state.

In some embodiments, the zoom lens is configured to focus with a 30.5° field angle in the short-focus state and focus with a 20° field angle in the telephoto-focus state.

In some embodiments, the zoom lens further includes an infrared filter, configured to filter infrared light, and the infrared filter is arranged between the imaging surface and the seventh lens.

In some embodiments, the first lens, the second lens, the third lens, the fourth lens, the fifth lens, the sixth lens, and the seventh lens are plastic lenses or glass lenses.

The present disclosure provides a camera module. The camera module includes a zoom lens, from an object side to an image side, including in order: a first lens group, having a negative focal power; a second lens group, having a positive focal power; and a third lens group, having a negative focal power; and a photosensitive element, arranged on an image side of the zoom lens; both the second lens group and the third lens group are movable relative to the first lens group while the first lens group remains stationary relative to an imaging surface; the zoom lens satisfies following formula: $-2.5<F1/F2<-1.5$ and $-2<F3/F2<-1$; wherein F1 is a focal distance of the first lens group, F2 is a focal distance of the second lens group, F3 is a focal distance of the third lens group.

In some embodiments, the zoom lens further includes: a prism, arranged on a side of the first lens group opposite to the third lens group and having an incident surface and an exit surface; the incident surface is perpendicular to the exit surface.

In some embodiments, the prism has a reflective surface configured to reflect incident light from the incident surface to the exit surface, the reflective surface is connected between the incident surface and the exit surface.

In some embodiments, the first lens group includes a first lens and a second lens arranged from the object side to the image side; the second lens group includes a third lens, a fourth lens, and a fifth lens arranged from the object side to the image side; the third lens group includes a sixth lens and a seventh lens arranged from the object side to the image side. The zoom lens further includes: an optical stop, including an aperture stop and three vignetting stops; the aperture stop is arranged on an object side surface of the third lens, a first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

In some embodiments, the zoom lens satisfies following formula: $25<f2/f1<35$; $-1.2<f3/f1<-0.2$; $1<f4/f1<2$; $-1.2<f5/f1<-0.2$; $-2<f6/f1<-0.5$ and $0.2<f7/f1<1$; f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

In some embodiments, the zoom lens satisfies following formula: $TTL/FS<2.5$ and $TTL/FL<1.5$; TTL is a distance on an optical axis from an object side surface of the first lens to the imaging surface, FS is a focal distance of the zoom lens in a short-focus state, and FL is a focal distance of the zoom lens in a telephoto-focus state.

In some embodiments, the zoom lens satisfies a following formula: TTL/H<4; TTL is a distance on an optical axis from an object side surface of the first lens to the imaging surface, H is a height of the imaging surface.

In some embodiments, the zoom lens is configured to focus with a 14 mm focal distance in the short-focus state and focus with a 23 mm focal distance in the telephoto-focus state.

In some embodiments, the zoom lens is configured to focus with a 30.5° field angle in the short-focus state and focus with a 20° field angle in the telephoto-focus state.

The present disclosure further provides an electronic device. The electronic device includes a housing; and a camera module arranged in the housing and including: a zoom lens and a photosensitive element arranged on an image side of the zoom lens; the zoom lens includes: a first lens group, having a negative focal power and a focal distance of F1; a second lens group, having a positive focal power and a focal distance of F2; and a third lens group, having a negative focal power and a focal distance of F3; the first lens group, the second lens group and the third lens group are arranged successively from an object side to the image side, and F1, F2 and F3 satisfy following formula: −2.5<F1/F2<−1.5 and −2<F3/F2<−1.

Figure 2:
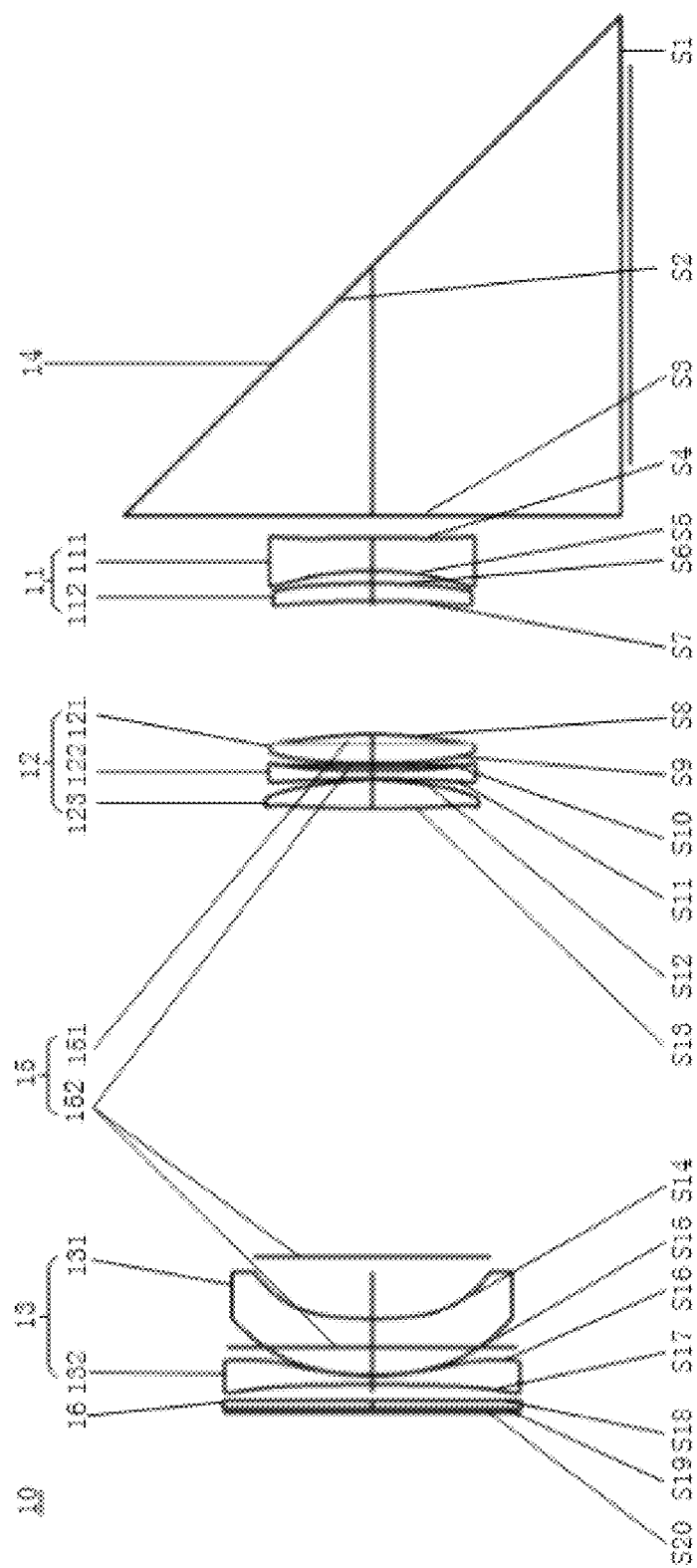
FIG. 2 is a structural schematic view of the zoom lens in a short-focus state according to some embodiments of the present disclosure.
Figure 3:
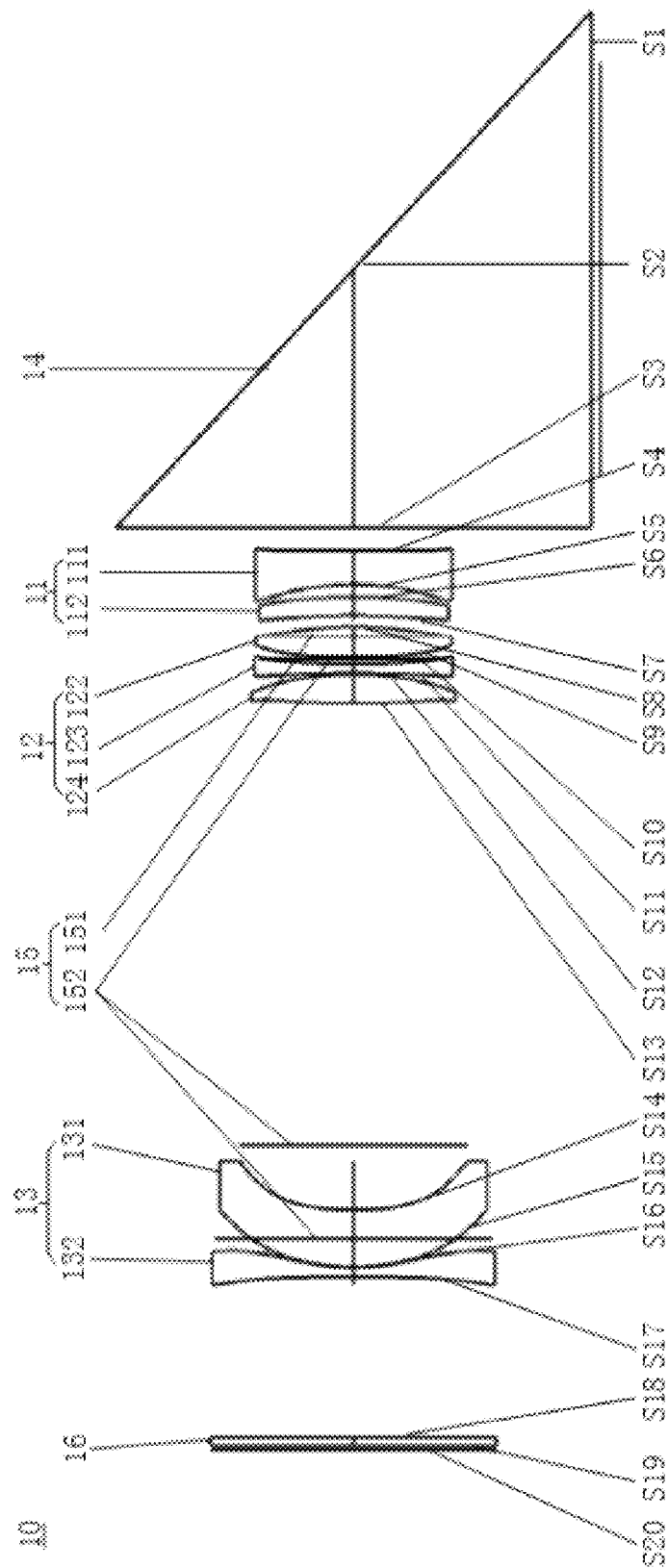
FIG. 3 is a structural schematic view of the zoom lens in a telephoto state according to some embodiments of the present disclosure.

Referring to FIGS. 1-3, in some embodiments, the zoom lens 10, from an object side to an image side, includes a first lens group 11, a second lens group 12 and a third lens group 13 in order. The first lens group 11 has a negative focal power. The second lens group 12 has a positive focal power. The third lens group 13 has a negative focal power. Both the second lens group 12 and the third lens group 13 are movable relative to the first lens group 11 while the first lens group 11 remains stationary relative to an imaging surface S20. The zoom lens 10 satisfies following formula: −2.5<F1/F2<−1.5 and −2<F3/F2<−1, F1 is a focal distance of the first lens group, F2 is a focal distance of the second lens group, F3 is a focal distance of the third lens group.

Referring to FIGS. 2 and 3, in some embodiments, the zoom lens 10 further includes a prism 14. The prism 14 is arranged on a side of the first lens group 11 opposite to the third lens group 13. An incident surface S1 of the prism 14 is perpendicular to an exit surface S3 of the prism 14.

Referring to FIGS. 2 and 3, in some embodiments, the first lens group 11 includes a first lens 111 and a second lens 112 arranged from the object side to the image side. The second lens group 12 includes a third lens 121, a fourth lens 122, and a fifth lens 123 arranged from the object side to the image side. The third lens group 13 includes a sixth lens 131 and a seventh lens 132 arranged from the object side to the image side. The zoom lens 10 further includes an optical stop 15. The optical stop 15 includes an aperture stop 151 and three vignetting stops 152. The aperture stop 151 is arranged on an object side surface S8 of the third lens 121. A first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

Referring to FIGS. 2 and 3, in some embodiments, the zoom lens 10 further satisfies following formula: 25<f2/f1<35; −1.2<f3/f1<−0.2; 1<f4/f1<2; −1.2<f5/f1<−0.2; −2<f6/f1<−0.5 and 0.2<f7/f1<1; f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

Referring to FIGS. 2 and 3, in some embodiments, the zoom lens 10 satisfies following formula: TTL/FS<2.5 and TTL/FL<1.5, TTL is a distance on an optical axis from an object side surface S4 of the first lens 111 to the imaging surface S20. FS is a focal distance of the zoom lens 10 in a short-focus state. FL is a focal distance of the zoom lens 10 in a telephoto-focus state.

Referring to FIGS. 2 and 3, in some embodiments, the zoom lens 10 satisfies a following formula: TTL/H<4, TTL is a distance on an optical axis from an object side surface S4 of the first lens 111 to the imaging surface S20. H is a height of the imaging surface S20.

Referring to FIGS. 2 and 3, in some embodiments, f=14 mm when the zoom lens 10 is in focus in the short-focus state; f=23 mm when the zoom lens 10 is in focus in the telephoto-focus state; f is a focal distance of the zoom lens 10.

Referring to FIGS. 2 and 3, in some embodiments, FOV=30.5° when the zoom lens 10 is in focus in the short-focus state; FOV=20° when the zoom lens 10 is in focus in the telephoto-focus state; FOV is a field angle of the zoom lens 10.

Referring to FIGS. 2 and 3, in some embodiments, the zoom lens 10 may further include an infrared filter 16. The infrared filter 16 is configured to filter infrared light. The infrared filter 16 is arranged between the imaging surface S20 and the seventh lens 132.

Referring to FIGS. 2 and 3, in some embodiments, the first lens 111, the second lens 112, the third lens 121, the fourth lens 122, the fifth lens 123, the sixth lens 131, and the seventh lens 132 are plastic lenses or glass lenses.

Referring to FIGS. 1-3 and 14, a camera module 100 according to a present embodiment includes a photosensitive element 20 and the zoom lens 10 according to any one of the above embodiments. The photosensitive element 20 is arranged on an image side of the zoom lens 10. The zoom lens 10, from an object side to an image side, includes a first lens group 11, a second lens group 12 and a third lens group 13 in order. The first lens group 11 has a negative focal power. The second lens group 12 has a positive focal power. The third lens group 13 has a negative focal power. Both the second lens group 12 and the third lens group 13 are movable relative to the first lens group 11 while the first lens group 11 remains stationary relative to an imaging surface S20. The zoom lens 10 satisfies following formula: −2.5<F1/F2<−1.5 and −2<F3/F2<−1, F1 is a focal distance of the first lens group, F2 is a focal distance of the second lens group, F3 is a focal distance of the third lens group.

Referring to FIGS. 2 and 3, in some embodiments, the zoom lens 10 further includes a prism 14. The prism 14 is arranged on a side of the first lens group 11 opposite to the third lens group 13. An incident surface S1 of the prism 14 is perpendicular to an exit surface S3 of the prism 14.

Referring to FIGS. 2 and 3, in some embodiments, the first lens group 11 includes a first lens 111 and a second lens 112 arranged from the object side to the image side. The second lens group 12 includes a third lens 121, a fourth lens 122, and a fifth lens 123 arranged from the object side to the image side. The third lens group 13 includes a sixth lens 131 and a seventh lens 132 arranged from the object side to the image side. The zoom lens 10 further includes an optical stop 15. The optical stop 15 includes an aperture stop 151 and three vignetting stops 152. The aperture stop 151 is arranged on an object side surface S8 of the third lens 121.

A first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

Referring to FIGS. 2 and 3, in some embodiments, the zoom lens 10 further satisfies the following expressions: $25<f2/f1<35$; $-1.2<f3/f1<-0.2$; $1<f4/f1<2$; $-1.2<f5/f1<-0.2$; $-2<f6/f1<-0.5$; $0.2<f7/f1<1$; f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

Referring to FIGS. 2 and 3, in some embodiments, the zoom lens 10 satisfies the following expressions: $TTL/FS<2.5$; $TTL/FL<1.5$. TTL is a distance on an optical axis from an object side surface S4 of the first lens 111 to the imaging surface S20. FS is a focal distance of the zoom lens 10 in a short-focus state. FL is a focal distance of the zoom lens 10 in a telephoto-focus state.

Referring to FIGS. 2 and 3, in some embodiments, the zoom lens 10 satisfies a following formula: $TTL/H<4$, TTL is a distance on an optical axis from an object side surface S4 of the first lens 111 to the imaging surface S20. H is a height of the imaging surface S20.

Referring to FIGS. 2 and 3, in some embodiments, f=14 mm when the zoom lens 10 is in focus in the short-focus state; f=23 mm when the zoom lens 10 is in focus in the telephoto-focus state; f is a focal distance of the zoom lens 10.

Referring to FIGS. 2 and 3, in some embodiments, FOV=30.5° when the zoom lens 10 is in focus in the short-focus state; FOV=20° when the zoom lens 10 is in focus in the telephoto-focus state; FOV is a field angle of the zoom lens 10.

Referring to FIGS. 2 and 3, in some embodiments, the zoom lens 10 may further include an infrared filter 16. The infrared filter 16 is configured to filter infrared light. The infrared filter 16 is arranged between the imaging surface S20 and the seventh lens 132.

Referring to FIGS. 2 and 3, in some embodiments, the first lens 111, the second lens 112, the third lens 121, the fourth lens 122, the fifth lens 123, the sixth lens 131, and the seventh lens 132 are plastic lenses or glass lenses.

Referring to FIGS. 1-3 and 15, an electronic device 1000 according to the present embodiment, includes a housing 200 and the camera module 100 according to any one of the above embodiments. The camera module 100 is mounted on the housing 200.

Referring to FIGS. 1 to 3 together, the zoom lens 10 according to the present embodiment, from an object side to an image side, includes a first lens group 11, a second lens group 12 and a third lens group 13 in order.

The first lens group 11 has a negative focal power. The second lens group 12 has a positive focal power. The third lens group 13 has a negative focal power. Both the second lens group 12 and the third lens group 13 are movable relative to the first lens group 11 while the first lens group 11 remains stationary relative to an imaging surface S20.

The zoom lens 10 satisfies following formula: $-2.5<F1/F2<-1.5$ and $-2<F3/F2<-1$, F1 is a focal distance of the first lens group, F2 is a focal distance of the second lens group, F3 is a focal distance of the third lens group. That is, F1/F2 may be any value between a range of $(-2.5, -1.5)$, for example, the value may be $-2.405$, $-2.255$, $-2.055$, $-1.994$ and $-1.525$, etc.; F3/F2 may be any value between a range of $(-2, -1)$, for example, the value may be $-1.998$, $-1.711$, $-1.684$, $-1.592$ and $-1.515$, etc. In the present embodiment, F1/F2=1.994, F3/F2=−1.592.

For the current digital zoom, although the captured scene may be larger, the definition of the captured scene may be reduced to a certain extent. Therefore, the digital zoom does not have much practical significance. When the hybrid zoom may make the image quality improved within a certain range, the parameters or numbers of the lens are definitely required to be adjusted when the focus length is needed to be adjusted subsequently.

The zoom lens 10 of the present disclosure could change the focal distance of the zoom lens 10 by the movement of the second lens group 12 and the third lens group 13 that are movable with respect to the first lens group 11. In this way, the clarity of the captured scene may be ensured, and the zoom lens 10 may be switched between a short-focus state and a telephoto-focus state without the need for multiple lenses to achieve a telephoto focus capturing and a short-focus capturing. In addition, the zoom lens 10 satisfies the formula of $-2.5<F1/F2<-1.5$ and $-2<F3/F2<-1$, such that the overall layout of the zoom lens 10 may be reasonable, and the range of movement of the second lens group 12 and the third lens group 13 when the focal distance state is switched may be reasonable, facilitating the production and assembly of the zoom lens 10.

In some embodiments, the second lens group 12 and the third lens group 13 remain stationary with respect to the imaging surface S20, and the first lens group 11 is movable with respect to the second lens group 12 or the third lens group 13 to change the focal distance of the zoom lens 10.

In some embodiments, the zoom lens 10 further includes a prism 14. The prism 14 is arranged on a side of the first lens group 11 opposite to the third lens group 13.

The prism 14 includes an incident surface S1, a reflective surface S2, and an exit surface S3. The incident surface S1 is perpendicular to the exit surface S3. The prism 14 may be a triangular prism 14. In particular, the cross-section of the prism 14 is a right triangle, one right side of two right sides of the right triangle is the incident surface S1, and the other one right side of the two right sides of the right triangle is the exit surface S3, and the hypotenuse of the right triangle is the reflective surface S2. The prism 14 is arranged on the side of the first lens group 11 opposite to the third lens group 13. The exit surface S3 of the prism 14 faces to the first lens group 11.

Understandably, the prism 14 can change an exit angle of incident light. The incident light is refracted by the prism 14 after being incident from the incident surface S1, then being emitted from the exit surface S3 after being reflected by the reflective surface S2, and finally exits toward the first lens group 11. In one embodiment, one of the surfaces of the prism 14 (e.g., the reflective surface S2) may be coated with a reflective material such as silver to reflect the incident light. Certainly, the incident light may exit directly after being refracted by the prism 14 without being reflected by the reflective surface S2. The prism 14 may be made of materials with a relatively good light transmission, such as glass, plastic, or the like. In this way, the zoom lens 10 may change the exit angle of the incident light through the prism 14. The whole zoom lens 10 can be designed as a periscope structure, which may be beneficial to reduce the thickness of the electronic device 1000 (FIG. 15 (a)-(b)) in which the zoom lens 10 is arranged.

Referring to FIGS. 2 and 3, in some embodiments, the first lens group 11 includes a first lens 111 and a second lens 112 arranged from the object side to the image side. The second lens group 12 includes a third lens 121, a fourth lens 122, and a fifth lens 123 arranged from the object side to the image side. The third lens group 13 includes a sixth lens 131 and a seventh lens 132 arranged from the object side to the image side. The first lens 111 has an object side surface S4 and an image side surface S5. The second lens 112 has an object side surface S6 and an image side surface S7. The third lens 121 has an object side surface S8 and an image side surface S9. The fourth lens 122 has an object side surface S10 and an image side surface S11. The fifth lens 123 has an object side surface S12 and an image side surface S13. The sixth lens 131 has an object side surface S14 and an image side surface S15. The seventh lens 132 has an object side surface S16 and an image side surface S17.

The zoom lens 10 further includes an optical stop 15. The optical stop 15 includes an aperture stop 151 and three vignetting stops 152. The aperture stop 151 is arranged on an object side surface S8 of the third lens 121. A first one of the three vignetting stops is arranged on an object side surface of the fourth lens, a second one of the three vignetting stops is arranged between the fifth lens and the sixth lens, a third one of the three vignetting stops is arranged on an image side surface of the sixth lens. In this way, the zoom lens 10 may better control the amount of entering light to improve the imaging effect by a reasonable setting of the aperture stop 151. The influence of a stray light on the zoom lens 10 may be effectively reduced and the imaging quality of the off-axis point may be improved by setting the three vignetting stops 152 reasonably.

In some embodiments, the zoom lens 10 further satisfies the following expressions: $25<f2/f1<35$; $-1.2<f3/f1<-0.2$; $1<f4/f1<2$; $-1.2<f5/f1<-0.2$; $-2<f6/f1<-0.5$ and $0.2<f7/f1<1$; f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens. That is, f2/f1 may be any value between a range of (25, 35), for example, the value may be 26.155, 27.544, 28.629, 30.565 and 33.897, etc. f3/f1 may be any value between a range of (−1.2, −0.2); for example, the value may be −1.125, −1.089, −0.761, −0.545 and −0.254, etc. f4/f1 may be any value between a range of (1, 2), for example, the value may be 1.125, 1.326, 1.410, 1.822 and 1.955, etc. f5/f1 may be any value between a range of (−1.2, −0.2), for example, the value may be −1.189, −0.988, −0.754, −0.660 and −0.221, etc. f6/f1 may be any value between a range of (−2, −0.5), for example, the value may be −1.945, −1.456, −1.351, −1.112 and −0.554, etc. f7/f1 may be any value between a range of (0.2, 1), for example, the value may be 0.315, 0.514, 0.656, 0.885 and 0.915, etc. In the present embodiment, $f2/f1=28.629$, $f3/f1=-0.761$, $f4/f1=1.410$, $f5/f1=-0.660$, $f6/f1=-1.351$, $f7/f1=0.514$.

The zoom lens 10 satisfies the expressions $25<f2/f1<35$; $-1.2<f3/f1<-0.2$; $1<f4/f1<2$; $-1.2<f5/f1<-0.2$; $-2<f6/f1<-0.5$ and $0.2<f7/f1<1$, such that the first lens 111 to the seventh lens 132 of the zoom lens 10 all have a suitable focal distance, which could satisfy the requirements of parameters of the zoom lens 10, such as focal distance and field angle, thus the zoom lens 10 could have a better imaging quality.

In some embodiments, the zoom lens 10 satisfies the following expressions: $TTL/FS<2.5$ and $TTL/FL<1.5$, TTL is a distance on an optical axis from an object side surface S4 of the first lens 111 to the imaging surface S20. FS is a focal distance of the zoom lens 10 in a short-focus state. FL is a focal distance of the zoom lens 10 in a telephoto-focus state. That is, TTL/FS may be any value less than 2.5, for example, the value may be 0.852, 1.432, 1.854, 1.996 and 2.185, etc. TTL/FL may be any value less than 1.5, for example, the value may be 0.445, 0.845, 1.145, 1.330 and 1.491, etc. In the present disclosure, $TTL/FS=2.185$, $TTL/FL=1.330$.

The zoom lens 10 satisfies the formula of $TTL/FS<2.5$ and $TTL/FL<1.5$, which may ensure that the zoom lens 10 has a shorter TTL when switching between the short-focus state and the telephoto-focus state.

In some embodiments, the zoom lens 10 satisfies the following formula: $TTL/H<4$, TTL is a distance on an optical axis from an object side surface S4 of the first lens 111 to the imaging surface S20; H is a height of the imaging surface S20. The height of the imaging surface S20 is a length of a diagonal of the imaging surface S20. That is, TTL/H may be any value less than 4, for example, the value may be 1.456, 2.515, 3.614, 3.825 and 3.916, etc. In the present disclosure, $TTL/H=3.825$.

The zoom lens 10 satisfies the formula of $TTL/H<4$, which may ensure the zoom lens 10 having a shorter TTL with a larger height of the imaging surface S20.

In some embodiments, $f=14$ mm when the zoom lens 10 is in focus in the short-focus state; $f=23$ mm when the zoom lens 10 is in focus in the telephoto-focus state; f is a focal distance of the zoom lens 10.

The zoom lens 10 may achieve the switching between the short-focus state and the telephoto-focus state by moving the second lens group 12 and the third lens group 13.

In some embodiments, $FOV=30.5°$ when the zoom lens 10 is in focus in the short-focus state; $FOV=20°$ when the zoom lens 10 is in focus in the telephoto-focus state; FOV is a field angle of the zoom lens 10.

The field angle of the zoom lens 10 may be switched between 20° and 30.5°, which may be beneficial to realize a telephoto and a wide-angle photography of the zoom lens 10.

In some embodiments, the zoom lens 10 may further include an infrared filter 16. The infrared filter 16 is configured to filter infrared light. The infrared filter 16 is arranged between the imaging surface S20 and the seventh lens 132. The infrared light in the light is filtered out after the light emitted from the seventh lens 132 and passes through the infrared filter 16, so as to prevent the infrared light from affecting the imaging, and enhance the imaging effect of the visible light imaging.

In some embodiments, the first lens 111, the second lens 112, the third lens 121, the fourth lens 122, the fifth lens 123, the sixth lens 131, and the seventh lens 132 are plastic lenses or glass lenses. For example, the first lens 111, the second lens 112, the third lens 121, the fourth lens 122, the fifth lens 123, the sixth lens 131, and the seventh lens 132 are plastic lenses. In this way, the zoom lens 10 may achieve ultra-thinning while correcting aberrations through a reasonable configuration of the material of the lens. In addition, the cost is low.

In some embodiments, at least one surface of the first lens 111, the second lens 112, the third lens 121, the fourth lens 122, the fifth lens 123, the sixth lens 131, and the seventh lens 132 of the zoom lens 10 is aspheric. In the present embodiment, object side surfaces and the image side surfaces of the first lens 111, the second lens 112, the third lens 121, the fourth lens 122, the fifth lens 123, the sixth lens 131 and the seventh lens 132 are aspheric. The shape of the aspheric surface is determined by the following formula:

$$Z = \frac{cr^2}{1+\sqrt{1-(k+1)c^2r^2}} + \sum Air^i,$$

Z is a longitudinal distance between any point on the aspheric surface and the apex of the surface; r is a distance from any point on the aspheric surface to the optical axis; c is a curvature of the apex (an inverse of the radius of curvature); k is a conic constant; and Ai is a correction coefficient of the i-th order of the aspheric surface.

In this way, the zoom lens 10 may effectively reduce the overall length of the zoom lens 10 by adjusting the radius of curvature and aspheric coefficient of each of the lens surface. Moreover, aberrations may be corrected effectively to improve the imaging quality.

Table 1 below lists the relevant parameters of each of the lens when the zoom lens 10 is in the short-focus state, including a surface type, a radius of curvature, a thickness, and material (refractive index/Abbe number). The first lens 111 has an object side surface S4 and an image side surface S5. The second lens 112 has an object side surface S6 and an image side surface S7. The third lens 121 has an object side surface S8 and an image side surface S9. The fourth lens 122 has an object side surface S10 and an image side surface S11. The fifth lens 123 has an object side surface S12 and an image side surface S13. The sixth lens 131 has an object side surface S14 and an image side surface S15. The seventh lens 132 has an object side surface S16 and an image side surface S17. The infrared filter 16 has an object side surface S18 and an image side surface S19. The thickness values in Table 1 represent a distance on the optical axis from the current surface to the next surface. In addition, Table 2 lists the aspheric coefficient of each of the surfaces in Table 1.

TABLE 1

| Surface Numbers | Surface Name | Surface Types | Radius of curvature (mm) | Thickness (mm) | Refractive index | Abbe Number |
|---|---|---|---|---|---|---|
| 0 | Object Face | Plane | Infinite | Infinite | | |
| 1 | Prism | sphere | Infinite | 6.6792E+00 | 1.52 | 64.2 |
| 2 | | sphere | Infinite | −6.6792E+00 | | |
| 3 | | sphere | Infinite | −5.9710E−01 | | |
| 4 | First lens | Even Aspheric surface | −4.9561E+01 | −8.8440E−01 | 1.54 | 55.8 |
| 5 | | Even Aspheric surface | −8.8060E+00 | −3.2990E−01 | | |
| 6 | Second lens | Even Aspheric surface | −2.9387E+01 | −4.7450E−01 | 1.64 | 22.5 |
| 7 | | Even Aspheric surface | −2.7039E+01 | −3.8015E+00 | | |
| 8 | Aperture stop | sphere | Infinite | 2.4220E−01 | | |
| 9 | Third lens | Even Aspheric surface | −1.2725E+01 | −7.6660E−01 | 1.54 | 55.8 |
| 10 | | Even Aspheric surface | 2.2705E+01 | −1.9130E−01 | | |
| 11 | Fourth lens | Even Aspheric surface | 2.4779E+01 | −2.3260E−01 | 1.66 | 20.5 |
| 12 | | Even Aspheric surface | −7.4504E+01 | 3.6120E−01 | | |
| 13 | Evignetting stop | sphere | Infinite | −3.8450E−01 | | |
| 14 | Fifth lens | Even Aspheric surface | −9.2042E+00 | −7.5800E−01 | 1.54 | 55.8 |
| 15 | | Even Aspheric surface | 3.0620E+01 | −1.1971E+01 | | |
| 16 | Evignetting stop | sphere | Infinite | −1.6500E+00 | | |
| 17 | Sixth lens | Even Aspheric surface | 1.1401E+01 | 1.4983E+00 | 1.67 | 19.4 |
| 18 | | Even Aspheric surface | 7.3587E+00 | 7.4110E−01 | | |
| 19 | Evignetting stop | sphere | Infinite | −7.6000E−01 | | |
| 20 | Seventh lens | Even Aspheric surface | 6.4129E+00 | −2.3260E−01 | 1.53 | 55.7 |

TABLE 1-continued

| Surface Numbers | Surface Name | Surface Types | Radius of curvature (mm) | Thickness (mm) | Refractive index | Abbe Number |
|---|---|---|---|---|---|---|
| 21 | | Even Aspheric surface | −3.6656E+01 | −4.2160E−01 | | |
| 22 | Infrared filter | sphere | Infinite | −2.1000E−01 | 1.52 | 64.2 |
| 23 | | sphere | Infinite | −1.1780E−01 | | |
| 24 | Imaging Face | sphere | Infinite | 0.0000E+00 | | |

TABLE 2

| Face Number | K | 4 | 6 | 8 | 10 | 12 | 14 | 16 |
|---|---|---|---|---|---|---|---|---|
| 4 | −8.67E+02 | 8.49E−04 | 1.46E−04 | −1.23E−07 | −5.22E−07 | −3.48E−08 | 1.89E−09 | −2.85E−11 |
| 5 | 1.02E+00 | −1.81E−03 | 1.92E−04 | 1.18E−05 | 7.97E−07 | −1.12E−08 | −1.24E−08 | −2.24E−09 |
| 6 | 7.15E+01 | −2.90E−03 | 2.31E−04 | −3.54E−07 | −3.90E−08 | 1.91E−08 | −3.13E−09 | −1.61E−09 |
| 7 | −7.97E+01 | −5.49E−04 | 1.01E−04 | 1.03E−05 | −3.43E−06 | 7.33E−08 | 3.64E−09 | 5.74E−10 |
| 9 | −9.37E+00 | −1.17E−03 | 1.61E−04 | 2.28E−06 | −1.80E−07 | 2.93E−08 | 4.56E−09 | −1.06E−09 |
| 10 | 4.85E+01 | 3.06E−04 | 1.71E−04 | 1.47E−05 | −3.22E−06 | −1.72E−07 | 5.90E−08 | −3.63E−09 |
| 11 | 6.56E+00 | −8.43E−04 | 2.07E−04 | −2.27E−06 | 3.11E−08 | −3.81E−08 | 1.31E−09 | 5.61E−10 |
| 12 | −1.76E+02 | −1.50E−03 | 4.29E−05 | 3.05E−06 | 1.08E−06 | 5.84E−08 | 1.55E−09 | −4.69E−10 |
| 14 | −6.16E+00 | −3.79E−04 | −2.03E−05 | −2.51E−06 | −3.82E−08 | −3.05E−08 | −3.30E−09 | −9.57E−10 |
| 15 | −2.65E+02 | 8.27E−04 | −7.51E−05 | 9.63E−07 | −2.19E−07 | −7.66E−08 | −1.14E−08 | −6.76E−10 |
| 17 | 9.69E+00 | 5.63E−03 | −1.15E−04 | 4.82E−05 | −9.12E−07 | −2.83E−07 | −7.87E−09 | 1.24E−09 |
| 18 | 1.04E+00 | 7.84E−04 | 2.45E−04 | −1.50E−05 | 5.85E−07 | −1.18E−08 | −4.43E−09 | 2.37E−10 |
| 20 | −5.51E+00 | −1.07E−03 | −1.64E−04 | 3.94E−07 | 7.58E−07 | 4.03E−08 | −8.83E−09 | 3.00E−10 |
| 21 | −1.01E+03 | 9.12E−04 | −2.56E−04 | 7.82E−06 | 7.70E−07 | −1.85E−08 | −4.14E−09 | 1.85E−10 |

When the zoom lens 10 is changed from the short-focus state to the telephoto-focus state, none of the material, thickness, curvature, aspheric coefficient of the lenses changes. The overall relative positions of the second lens group 12 and the third lens group 13 with respect to the first lens group 11 are changed, such that a pitch between the image side surface S7 of the second lens 112 and the object side surface S8 of the third lens 121, a pitch between the image side surface S13 of the fifth lens 123 and the object side surface S14 of the sixth lens 131, and a pitch between the image side surface S17 of the seventh lens 132 and the object side surface S18 of the infrared filter 16 are changed.

Specifically, when the zoom lens 10 is changed from the short-focus state to the telephoto-focus state, the pitch between the image side surface S7 of the second lens 112 and the object side surface S8 of the third lens 121 is decreased, both the pitch between the image side surface S13 of the fifth lens 123 and the object side surface S14 of the sixth lens 131, and the pitch between the image side surface S17 of the seventh lens 132 and the object side surface S18 of the infrared filter 16 are increased. Please refer to Tables 1 and 3 for the specific pitch variations. Table 3 shows the relevant parameters of each of the lens of the zoom lens 10 in the telephoto state.

TABLE 3

| Surface Numbers | Surface Name | Surface Types | Radius of curvature (mm) | Thickness (mm) | Refractive index | Abbe Number |
|---|---|---|---|---|---|---|
| 0 | Object Face | Plane | Infinite | Infinite | | |
| 1 | Prism | sphere | Infinite | 6.6792E+00 | 1.52 | 64.2 |
| 2 | | sphere | Infinite | −6.6792E+00 | | |
| 3 | | sphere | Infinite | −5.9710E−01 | | |
| 4 | First lens | Even Aspheric surface | −4.9561E+01 | −8.8440E−01 | 1.54 | 55.8 |
| 5 | | Even Aspheric surface | −8.8060E+00 | −3.2990E−01 | | |
| 6 | Second lens | Even Aspheric surface | −2.9387E+01 | −4.7450E−01 | 1.64 | 22.5 |
| 7 | | Even Aspheric surface | −2.7039E+01 | −5.3600E−01 | | |
| 8 | Aperture stop | sphere | Infinite | 2.4220E−01 | | |
| 9 | Third lens | Even Aspheric surface | −1.2725E+01 | −7.6660E−01 | 1.54 | 55.8 |

TABLE 3-continued

| Surface Numbers | Surface Name | Surface Types | Radius of curvature (mm) | Thickness (mm) | Refractive index | Abbe Number |
|---|---|---|---|---|---|---|
| 10 | | Even Aspheric surface | 2.2705E+01 | −1.9130E−01 | | |
| 11 | Fourth lens | Even Aspheric surface | 2.4779E+01 | −2.3260E−01 | 1.66 | 20.5 |
| 12 | | Even Aspheric surface | −7.4504E+01 | 3.6120E−01 | | |
| 13 | Evignetting stop | sphere | Infinite | −3.8450E−01 | | |
| 14 | Fifth lens | Even Aspheric surface | −9.2042E+00 | −7.5800E−01 | 1.54 | 55.8 |
| 15 | | Even Aspheric surface | 3.0620E+01 | −1.1454E+01 | | |
| 16 | Evignetting stop | sphere | Infinite | −1.6500E+00 | | |
| 17 | Sixth lens | Even Aspheric surface | 1.1401E+01 | −1.4983E+00 | 1.67 | 19.4 |
| 18 | | Even Aspheric surface | 7.3587E+00 | 7.4110E−01 | | |
| 19 | Evignetting stop | sphere | Infinite | −7.6000E−01 | | |
| 20 | Seventh lens | Even Aspheric surface | 6.4129E+00 | −2.3260E−01 | 1.53 | 55.7 |
| 21 | | Even Aspheric surface | −3.6656E+01 | −4.1603E+00 | | |
| 22 | Infrared filter | sphere | Infinite | −2.1000E−01 | 1.52 | 64.2 |
| 23 | | sphere | Infinite | −1.1780E−01 | | |
| 24 | Imaging Face | sphere | Infinite | 0.0000E+00 | | |

The two lens parameters corresponding to the short-focus state and the telephoto-focus state may result that the zoom lens 10 exhibits two focal distance states, one of the two focal distance states is that: the focal distance f=14 mm, an aperture (F/#) is 3.2, the field angle is 30.5°; and the other one of the two focal distance states is that: the focal distance f=23 mm, the aperture (F/#) is 4.4, the field angle is 20°; the aperture (F/#) is a ratio of the focal distance of the zoom lens 10 to an entrance pupil diameter. The aperture is configured to determine the amount of the entering light of the zoom lens 10, and to adjust the amount of the light entering into the zoom lens 10. The smaller the value of the aperture, the larger the aperture, and the larger the amount of the entering light. On the contrary, the larger the value of the aperture, the smaller the aperture, and the smaller the amount of the entering light.

Figure 4:
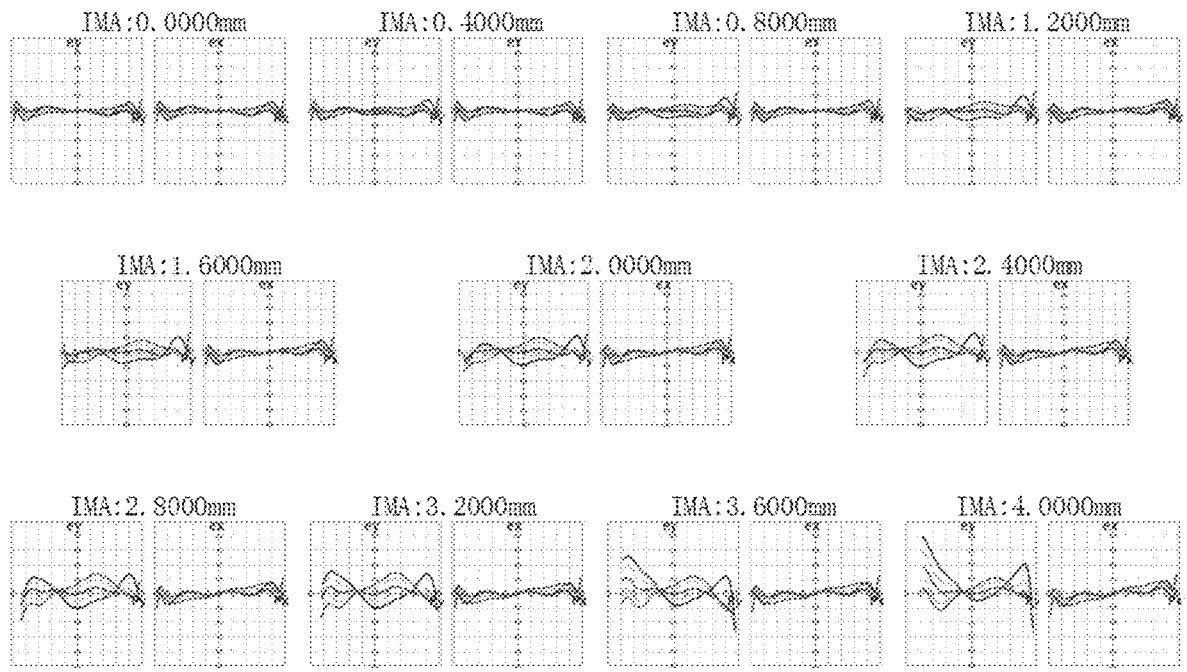
FIG. 4 is an aberration view of the zoom lens in the short-focus state according to some embodiments of the present disclosure.
Figure 5:
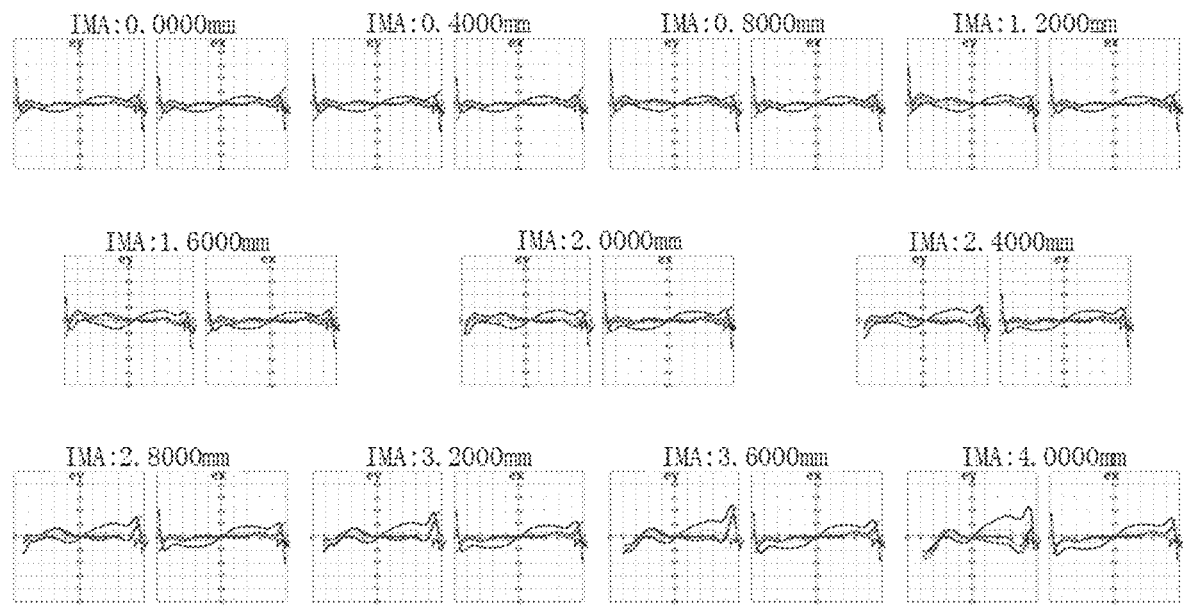
FIG. 5 is an aberration view of the zoom lens in the telephoto state according to some embodiments of the present disclosure.

FIG. 4 and FIG. 5 are the system aberration view of the zoom lens 10 in the short-focus state and the telephoto state according to the present embodiment, respectively. In the actual optical system, the result obtained by non-paraxial ray tracing is inconsistent with the result obtained by paraxial ray tracing, the aberration refers to the deviation from an ideal condition of Gaussian optics (first-order approximation theory or paraxial ray). The aberrations are mainly classified as a spherical aberration, coma, field curvature, astigmatism, distortion, chromatic aberration, and wave aberration. IMA in FIGS. 4 and 5 is the length of the diagonal of the imaging surface S20.

Figure 6:
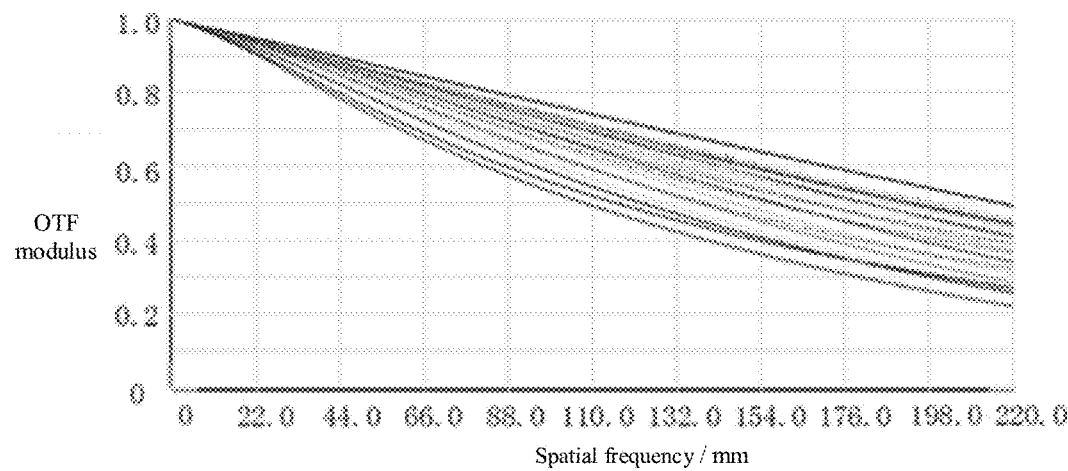
FIG. 6 is a modulation transfer function diagram of the zoom lens in the short-focus state according to some embodiments of the present disclosure.
Figure 7:
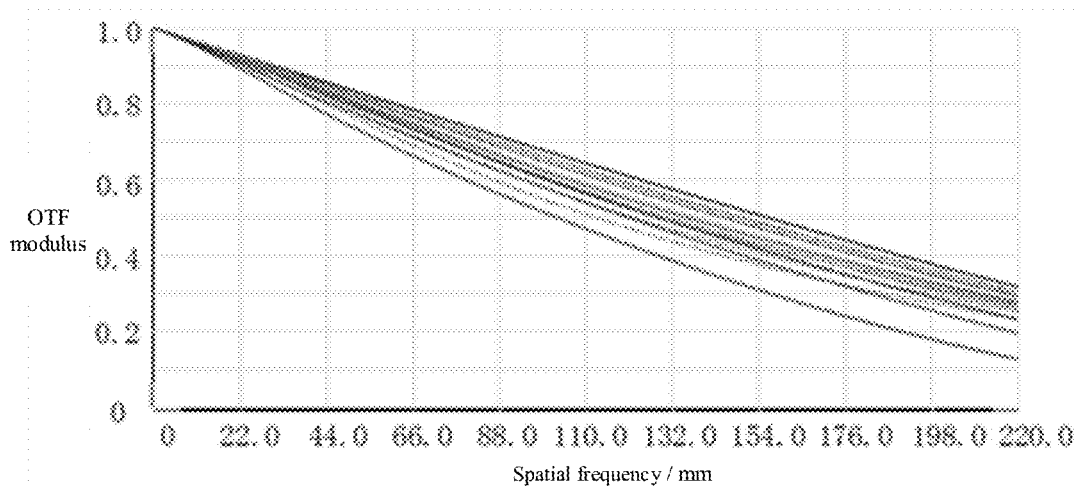
FIG. 7 is a modulation transfer function diagram of the zoom lens in the telephoto state according to some embodiments of the present disclosure.

FIG. 6 and FIG. 7 are modulation transfer function (MTF) diagrams of the zoom lens 10 in the short-focus state and the telephoto state according to the present embodiment. Optical Transfer Function (OTF) refers to a function that characterizes the relative variation of a modulation to a lateral phase shift in the imaging process, with a spatial frequency as a variable. The optical transfer function is a filtering transformation of the optical system to the spatial spectrum. The MTF values of the zoom lens 10 in the short-focus state and the telephoto-focus state are close to the diffraction limit and the imaging quality is good.

Figure 8:
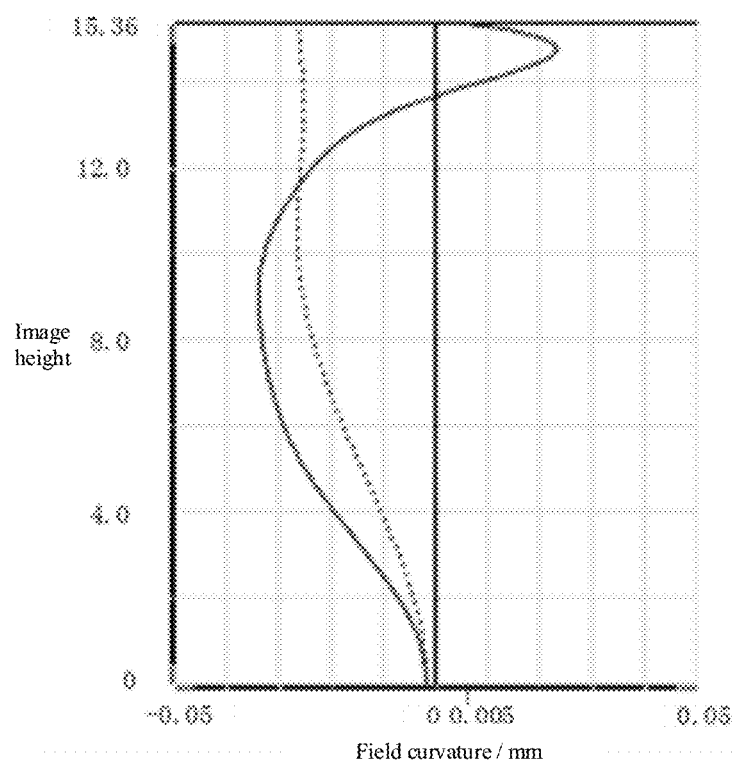
FIG. 8 is a field curvature diagram of the zoom lens in the short-focus state according to some embodiments of the present disclosure.
Figure 9:
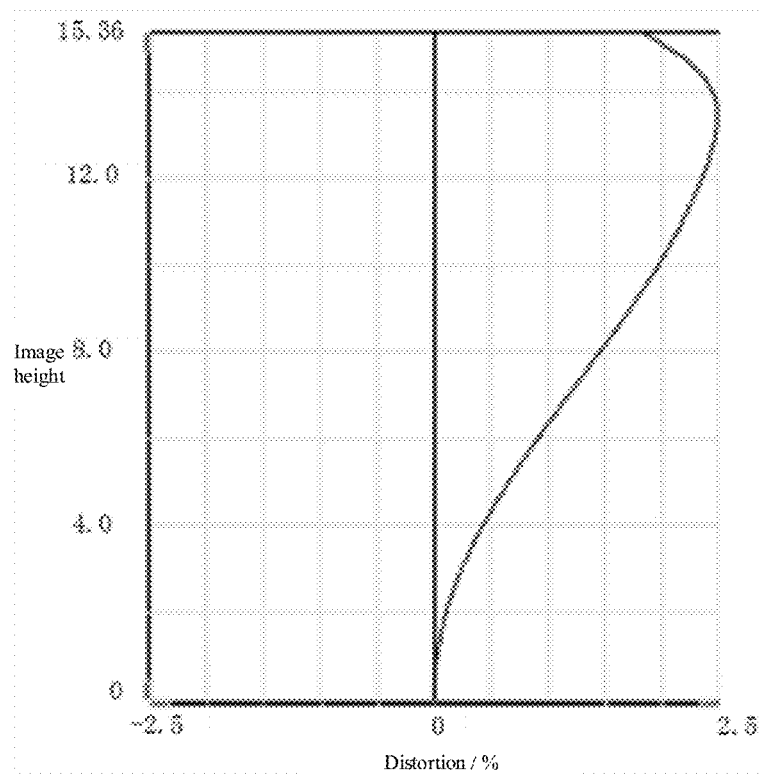
FIG. 9 is a distortion diagram of the zoom lens in the short-focus state according to some embodiments of the present disclosure.
Figure 10:
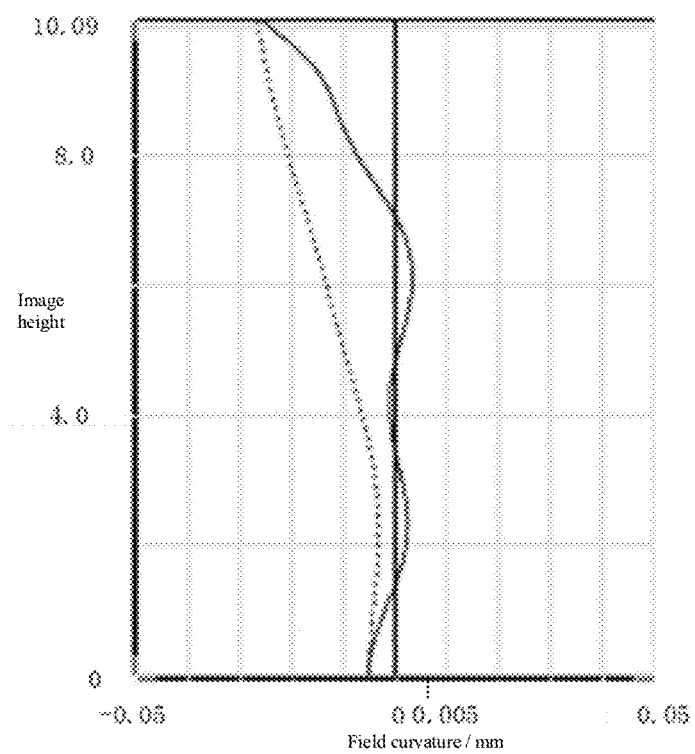
FIG. 10 is the field curvature diagram of the zoom lens in the telephoto state according to some embodiments of the present disclosure.
Figure 11:
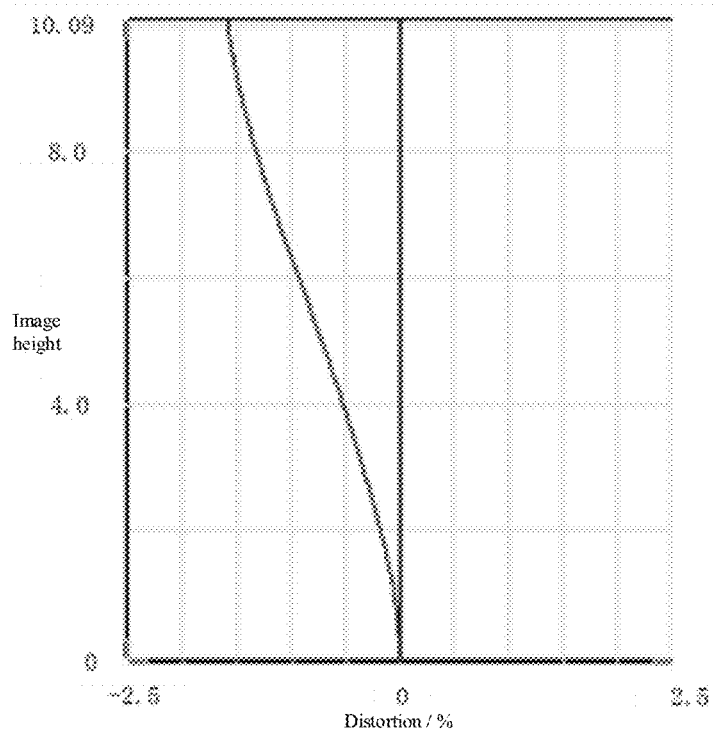
FIG. 11 is the distortion diagram of the zoom lens in the telephoto state according to some embodiments of the present disclosure.

FIGS. 8 and 9 are respectively a field curvature diagram and a distortion diagram of the zoom lens 10 in the short-focus state according to the present embodiment. FIGS. 10 and 11 are respectively the field curvature diagram and the distortion diagram of the zoom lens 10 in the telephoto state according to the present embodiments. When the lens has a field curvature, the intersection of the entire beam does not coincide with the ideal image point. Although a sharp image point can be obtained at each specific point, the entire image plane is a curved surface, such that the entire image plane cannot be viewed clearly at the same time during microscopic inspection, which makes it difficult to observe the picture and take a picture. Lens distortion is actually a general term for a perspective distortion which is inherent to optical lenses. That is, a distortion caused by the perspective, which is very detrimental to the imaging quality of photographs. The field curvatures of the zoom lens 10 in both the short-focus state and the telephoto-focus state are within 5 micrometers (um), and the distortion is less than 2.5%, which may ensure that the image captured by the zoom lens 10 is curved and flat, with no visible distortion.

Figure 12:
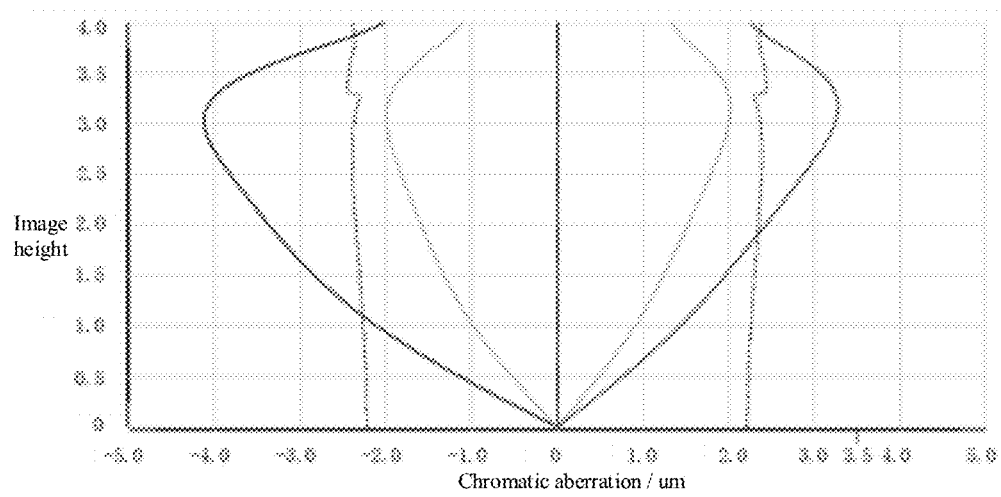
FIG. 12 is a vertical axis chromatic aberration diagram of the zoom lens in the short-focus state according to some embodiments of the present disclosure.
Figure 13:
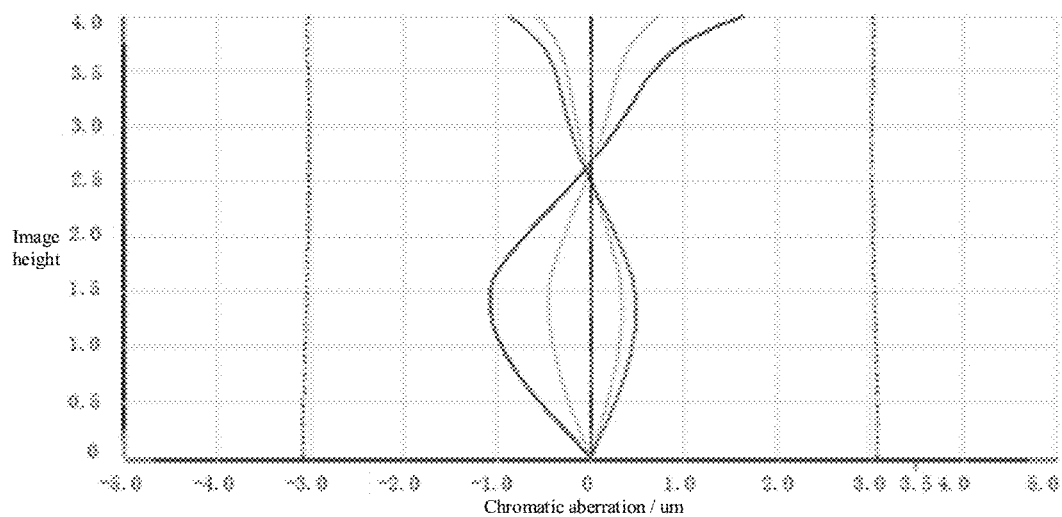
FIG. 13 is a vertical axis chromatic aberration diagram of the zoom lens in the telephoto state according to some embodiments of the present disclosure.

FIGS. 12 and 13 vertical axis chromatic aberration diagrams of the zoom lens 10 in the short-focus state and the telephoto state according to the present embodiments, respectively. Color difference, also referred to as chromatic aberration, is a serious defect in lens imaging. In simple terms, the color difference is a difference in color, which occurs when polychromatic light is a light source. The monochromatic light does not produce the chromatic aberration. The chromatic aberrations of the zoom lens 10 in both the short-focus state and the telephoto-focus state are less than 3.5 um, which may ensure that there is no visible color difference within the view field scope of the entire image.

Figure 14:
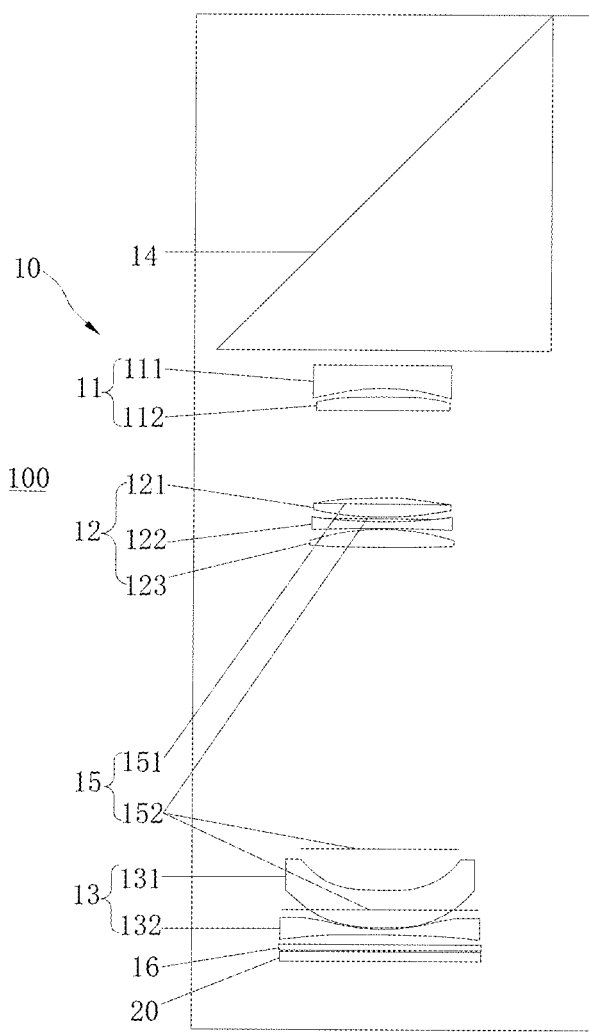
FIG. 14 is a structural schematic view of a camera module according to some embodiments of the present disclosure.

Referring to FIG. 14, a camera module 100 according to the present embodiment, includes a photosensitive element 20 and the zoom lens 10 according to any of the above embodiments. The photosensitive element 20 is arranged on an image side of the zoom lens 10.

The photosensitive element 20 may be a complementary metal oxide semiconductor (CMOS) photosensitive element 20 or a charge-coupled device (CCD) photosensitive element 20.

Figure 15:
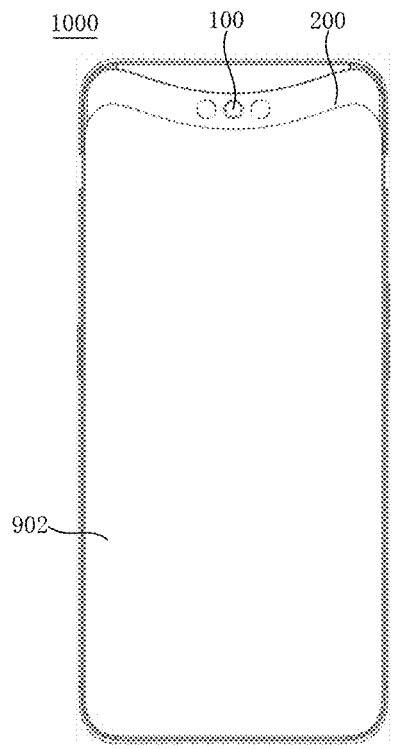
FIG. 15 (*a*) is a structural schematic view of an electronic device from a viewing angle according to some embodiments of the present disclosure.
Figure 15:
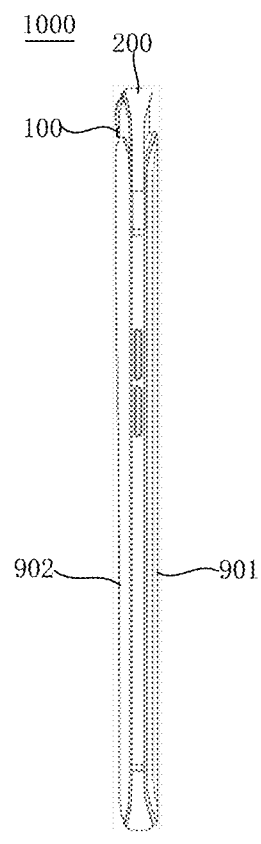

Referring to FIG. 15 (a)-(b), an electronic device 1000 according to the present embodiment, includes a housing 200 and the camera module 100 according to the above embodiments. The camera module 100 is mounted on the housing 200.

The electronic device 1000 according to the present embodiment, includes but is not limited to, information terminal devices such as a smart phone, an access control system, a surveillance camera, a mobile phone, a personal digital assistant (PDA), a game console, a personal computer (PC), a camera, a smart watch, a tablet computer, or home appliances with a photo taking function.

The electronic device 1000 includes a front surface 901 and a rear surface 902. The camera module 100 may be arranged on the front surface 901 as a front camera, and the camera module 100 may be also arranged on the rear surface 902 as a rear camera. In the present embodiment, the camera module 100 is arranged on the rear surface 902 as a rear camera.

The camera module 100 and the electronic device 1000 of the present disclosure could change the focal distance of the zoom lens 10 by the movement of the second lens group 12 and the third lens group 13 that are movable with respect to the first lens group 11. In this way, the clarity of the captured scene may be ensured, there is no need for multiple lenses to achieve a telephoto focus capturing and a short-focus capturing. In addition, the zoom lens 10 satisfies the formula of −2.5<F1/F2<−1.5 and −2<F3/F2<−1, such that the overall layout of the zoom lens 10 may be reasonable, and the range of movement of the second lens group 12 and the third lens group 13 when the focal distance state is switched may be reasonable, facilitating the production and assembly of the zoom lens 10.

In the description of the present specification, references terms "certain embodiments", "one embodiment", "some embodiments", "an exemplary embodiment", "an example", "a specific example" or "some examples" etc., mean that a specific feature, structure, material, or characteristic described in connection with the embodiment or example is included in at least one embodiment or example of the present disclosure. In the present specification, the schematic representations of the above terms do not necessarily refer to the same embodiment or example. Furthermore, the specific feature, structure, material, or characteristic described may be combined in any suitable manner in any one or more embodiments or examples.

In addition, the terms "first" and "second" are only used for describing purposes and should not be interpreted as indicating or implying the relative importance or implying specifying the number of indicated technical features. Thus, features defined with "first", "second" may include at least one feature either explicitly or implicitly. In the description of the present disclosure, the meaning of "a plurality of" is at least two, for example, two, three, etc., unless specifically defined otherwise.

When embodiments of the present disclosure have been shown and described above, it can be understood that the embodiments described above are exemplary, which are not allowed to be construed as limitations for the present disclosure. Those of ordinary skill in the art can make variations, modifications, substitutions and alterations to the embodiments described above within the scope of the present disclosure, which is defined by claims and their equivalents.

What is claimed is:

1. A zoom lens, comprising in order from an object side to an image side:
   a first lens group, having a negative focal power;
   a second lens group, having a positive focal power; and
   a third lens group, having a negative focal power, wherein both the second lens group and the third lens group are movable relative to the first lens group while the first lens group remains stationary relative to an imaging surface; the zoom lens satisfies following formula:

$-2.5<FG1/FG2<-1.5$ and $-2<FG3/FG2<-1$;

wherein FG1 is a focal distance of the first lens group, FG2 is a focal distance of the second lens group, FG3 is a focal distance of the third lens group;
   wherein the first lens group comprises a first lens and a second lens arranged from the object side to the image side;
   wherein the second lens group comprises a third lens, a fourth lens, and a fifth lens arranged from the object side to the image side;
   wherein the third lens group comprises a sixth lens and a seventh lens arranged from the object side to the image side.

2. The zoom lens according to claim 1, further comprising:
   a prism, arranged on a side of the first lens group opposite to the third lens group and having an incident surface and an exit surface, wherein the incident surface is perpendicular to the exit surface.

3. The zoom lens according to claim 1, wherein the zoom lens further comprises: an optical stop, comprising an aperture stop and three vignetting stops, wherein the aperture stop is arranged on an object side surface of the third lens, a first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

4. The zoom lens according to claim 3, satisfying following formula:
   $25<f2/f1<35$; $-1.2<f3/f1<-0.2$; $1<f4/f1<2$; $-1.2<f5/f1<-0.2$; $-2<f6/f1<-0.5$ and $0.2<f7/f1<1$; wherein f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

5. The zoom lens according to claim 3, satisfying following formula:
TTL/FS<2.5 and TTL/FL<1.5; wherein TTL is a distance on an optical axis from an object side surface of the first lens to the imaging surface, FS is a focal distance of the zoom lens in a short-focus state, and FL is a focal distance of the zoom lens in a telephoto-focus state.

6. The zoom lens according to claim 1, satisfying a following formula:
TTL/H<4; wherein TTL is a distance on an optical axis from an object side surface of the first lens to the imaging surface, H is a height of the imaging surface.

7. The zoom lens according to claim 1, wherein the zoom lens is configured to focus with a 14 mm focal distance in a short-focus state and focus with a 23 mm focal distance in a telephoto-focus state.

8. The zoom lens according to claim 1, wherein the zoom lens is configured to focus with a 30.5° field angle in a short-focus state and focus with a 20° field angle in a telephoto-focus state.

9. The zoom lens according to claim 3, further comprising:
an infrared filter, configured to filter infrared light, wherein the infrared filter is arranged between the imaging surface and the seventh lens.

10. The zoom lens according to claim 3, wherein the first lens, the second lens, the third lens, the fourth lens, the fifth lens, the sixth lens, and the seventh lens are plastic lenses or glass lenses.

11. A camera module, comprising:
a zoom lens, from an object side to an image side, comprising in order:
a first lens group, having a negative focal power;
a second lens group, having a positive focal power; and
a third lens group, having a negative focal power; and
a photosensitive element, arranged on an image side of the zoom lens;
wherein both the second lens group and the third lens group are movable relative to the first lens group while the first lens group remains stationary relative to an imaging surface; the zoom lens satisfies following formula:

−2.5<*FG*1/*FG*2<−1.5 and −2<*FG*3/*FG*2<−1;

wherein FG1 is a focal distance of the first lens group, FG2 is a focal distance of the second lens group, FG3 is a focal distance of the third lens group;
wherein the first lens group comprises a first lens and a second lens arranged from the object side to the image side;
wherein the second lens group comprises a third lens, a fourth lens, and a fifth lens arranged from the object side to the image side;
wherein the third lens group comprises a sixth lens and a seventh lens arranged from the object side to the image side.

12. The camera module according to claim 11, wherein the zoom lens further comprises:
a prism, arranged on a side of the first lens group opposite to the third lens group and having an incident surface and an exit surface, wherein the incident surface is perpendicular to the exit surface.

13. The camera module according to claim 12, wherein the prism has a reflective surface configured to reflect incident light from the incident surface to the exit surface, the reflective surface is connected between the incident surface and the exit surface.

14. The camera module according to claim 11, wherein the zoom lens further comprises:
an optical stop, comprising an aperture stop and three vignetting stops, wherein the aperture stop is arranged on an object side surface of the third lens, a first one of the three vignetting stops is arranged on an object side surface of the fourth lens, a second one of the three vignetting stops is arranged between the fifth lens and the sixth lens, a third one of the three vignetting stops is arranged on an image side surface of the sixth lens.

15. The camera module according to claim 14, wherein the zoom lens satisfies following formula:
25<f2/f1<35; −1.2<f3/f1<−0.2; 1<f4/f1<2; −1.2<f5/f1<−0.2; −2<f6/f1<−0.5 and 0.2<f7/f1<1; wherein f1 is a focal distance of the first lens, f2 is a focal distance of the second lens, f3 is a focal distance of the third lens, f4 is a focal distance of the fourth lens, f5 is a focal distance of the fifth lens, f6 is a focal distance of the sixth lens, f7 is a focal distance of the seventh lens.

16. The camera module according to claim 13, wherein the zoom lens satisfies following formula:
TTL/FS<2.5 and TTL/FL<1.5; wherein TTL is a distance on an optical axis from an object side surface of the first lens to the imaging surface, FS is a focal distance of the zoom lens in a short-focus state, and FL is a focal distance of the zoom lens in a telephoto-focus state.

17. The camera module according to claim 11, wherein the zoom lens satisfies a following formula:
TTL/H<4; wherein TTL is a distance on an optical axis from an object side surface of the first lens to the imaging surface, H is a height of the imaging surface.

18. The camera module according to claim 11, wherein the zoom lens is configured to focus with a 14 mm focal distance in a short-focus state and focus with a 23 mm focal distance in a telephoto-focus state.

19. The camera module according to claim 11, wherein the zoom lens is configured to focus with a 30.5° field angle in a short-focus state and focus with a 20° field angle in a telephoto-focus state.

20. An electronic device, comprising:
a housing; and
a camera module arranged in the housing and comprising:
a zoom lens and a photosensitive element arranged on an image side of the zoom lens;
wherein the zoom lens comprises:
a first lens group, having a negative focal power and a focal distance of FG1;
a second lens group, having a positive focal power and a focal distance of FG2; and
a third lens group, having a negative focal power and a focal distance of FG3;
wherein the first lens group, the second lens group and the third lens group are arranged successively from an object side to the image side, and FG1, FG2 and FG3 satisfy following formula: −2.5<FG1/FG2<−1.5 and −2<FG3/FG2<−1;
wherein the first lens group comprises a first lens and a second lens arranged from the object side to the image side;
wherein the second lens group comprises a third lens, a fourth lens, and a fifth lens arranged from the object side to the image side;
wherein the third lens group comprises a sixth lens and a seventh lens arranged from the object side to the image side.

* * * * *